RECORDING MEDIUM UTILIZING GRAIN-FREE FLUORESCENT MATERIAL

Filed Oct. 27, 1964

INVENTOR.
STEPHEN P. BIRKELAND
BY
Carpenter, Abbott, Coulter & Kinney
ATTORNEYS

United States Patent Office 3,418,470
Patented Dec. 24, 1968

3,418,470
RECORDING MEDIUM UTILIZING GRAIN-FREE FLUORESCENT MATERIAL

Stephen P. Birkeland, White Bear Lake, Minn., assignor to Minnesota Mining and Manufacturing Company, St. Paul, Minn., a corporation of Delaware
Filed Oct. 27, 1964, Ser. No. 406,678
28 Claims. (Cl. 250—71)

ABSTRACT OF THE DISCLOSURE

This invention relates to sheet-like recording media which employ grain-free imaging materials and grain-free fluorescent materials. Such media are adapted for recording differential actinic radiation and are capable of being readout thereof by electron bombardment so as to produce differential photon energy emission therefrom.

Figure 1A:
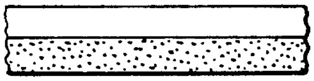

This invention relates to new and very useful grain-free recording media.

In one embodiment this invention relates to a grain-free sheet-like recording medium adapted for recording differential actinic radiation and capable of being read out thereafter by causing a so-irradiated medium to differentially fluoresce through electron bombardment.

While the art knows of ways to record actinic radiation modulated with information and to read out such recorded information using uniform actinic radiation to generate differential photon energy representative of the original information, such techniques generally require the use of inefficient optical to electrical transducers such as flying spot scanners for read out. By the present invention there is provided a class of new information recording media which provide for differential photon energy high resolution readout generated using a focused electron beam.

Any system useful for recording and electronic readout must be capable of generating a high signal-to-noise ratio upon readout. One of the main contributions to media noise and thus to total system noise in the graininess in the media, either in the imaging layer or in the fluorescent layer. By eliminating all graininess, media noise is reduced to a minimum thus making very high resolution recording and readout possible.

This invention utilizes the discovery that grain-free imaging materials in combination with grain-free fluorescent materials provide recording media capable of information recordation with a 10:1 signal-to-noise ratio. Since the recording media of this invention are grain free, loss of resolution and detail caused by actinic radiation scattering effects is avoided. A preferred class of media within this invention are capable of high density storage (say, not less than about $10^6$ information bits per square millimeter of media surface area).

It is accordingly an object of the present invention to provide a fluorescent recording medium capable of recording and reproducing information with a high signal-to-noise ratio.

It is another object of this invention to provide a recording medium for the storage and retrieval of electrical signals of relatively high frequency at a high storage density.

It is another object of this invention to provide a recording medium from which prerecorded information is read out using internally generated photon energy.

It is another object of this invention to provide a recording medium suitable for both recording and reproduction using a scanning electron beam or other sequentially positioned actinic radiation.

It is another object of this invention to provide a recording medium which is adapted for long time storage of information and which is also adapted for the read out of such information without associated appreciable destruction or deterioration of the recording medium.

It is a further object of this invention to provide a fluorescent recording medium capable of retention of prerecorded high resolution information during read out, such resolution thus being limited only by the dimensional limitations associated with the recording radiation and the read out radiation.

Figure 3A:
Figure 3B:
Figure 4:
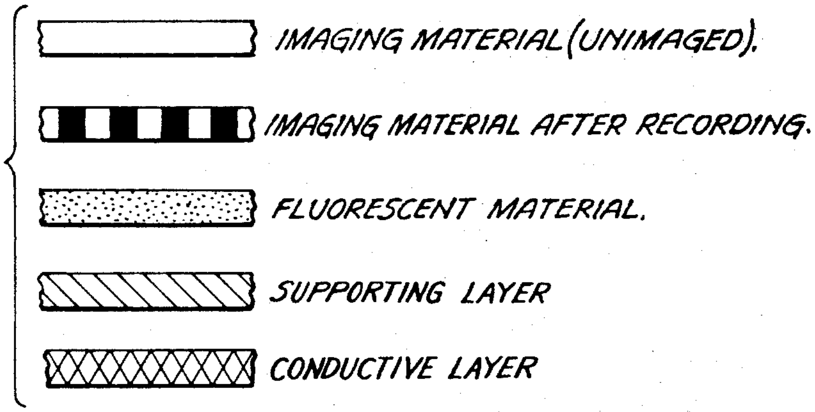

Other and further objects of this invention will be apparent to those skilled in the art from a reading of the present specification taken together with the drawings wherein:

FIGURE 1, parts A and B, respectively, illustrate diagrammatically and cross-sectionally one medium construction of the invention termed for convenience herein the "adjacent two-layered construction";

FIGURE 2, parts A and B, respectively, illustrate diagrammatically and cross-sectionally a second medium construction of the invention termed for convenience herein the "spaced two-layered construction";

FIGURE 3, parts A and B, respectively, illustrate diagrammatically and cross-sectionally a third medium construction of the invention termed for convenience herein the "composite construction"; and FIGURE 4 provides a legend or key explaining tersely the shading scheme and the numbering scheme used in the foregoing FIGURES 1–3 and their respective parts.

For purposes of clarity it is deemed advisable to define certain terms as used in this application as follows:

By the term "material" as used in this application, reference is had to a functional component of a medium of the invention which may consist of a homogeneous mixture or composition of one or more associated chemical components usually in a layer or film form.

By the term "solid" as used in this application reference is had to a material which displays substantially no tendency to flow at room temperature and atmospheric pressures.

By the term "photon energy" as used in this application reference is had to radiant energy ranging from ultraviolet radiation up through infrared radiation thus including the visible light spectrum (i.e., energy having wavelengths of from about 400 to 700 millimicrons) associated with an excited fluorescent material.

By the term "actinic radiation" as used in this application reference is had not only to photon energy as herein before defined but to all electromagnetic radiation and also to ionizing radiation (including particulate energy such as alpha particles, protons, electrons, neutrons, nuclides, and other subatomic particles).

By the term "grain-free" as used in this application reference is had to a material which is essentially a homogeneous molecular dispersion leaving no crystalline aggregates larger than about 100 A. ($10^{-2}$ microns). That no aggregates larger than 100 A. exist in a given imaging or fluorescent material, and that it is indeed grain free under the above definition, is conveniently determined by observing a thin section of material ($0.1\mu$) in an electron microscope. If aggregates are present, their size may be measured directly and their crystalline or amorphous nature is readily determined by the well known method of selected area defraction.

By the term "dwell time" as used in this application reference is had to the average time in seconds the spot diameter formed by a moving electron beam spends in an area equal to its own.

By the term "imaging material" as used in this application reference is had to a material which is capable of developing therein, following exposure to differential actinic radiation, regions corresponding to, or representative of differential irradiation.

By the term "fluorescent material" as used in this application reference is had to a photon-emitting, actinic radiation excitable material.

By the term "real time readout" as used in this application reference is had to the fact that information can be retrieved from a recording medium substantially immediately after a recording (storing) operation without the need for any intervening processing.

Recording media of this invention all employ both grain-free substantially nonfluorescent, organic imaging materials and grain-free fluorescent materials.

While any grain-free fluorescent material can be used in media of this invention, it is preferred to employ a class of materials generally called scintillators which consist of a solid solution of a fluorescent material in a highly viscous or polymeric solvent. Frequently there is evidence of interaction between fluorescent material and solvent such that the resultant efficiency of emitted fluorescence light differs from that of the fluorescent material alone. Preferred scintillators employ aromatic and vinyl polymers as solvents. Preferred solutes are linearly conjugated aromatic compounds, especially those having three or more aromatic ring structures per molecule. It is preferred to use fluorescent materials having conversion factors (ratio of photon energy output to incident electron excitation energy) not less than about 5 to 15%. It is also preferred to use scintillators which have photon emission spectra in the range of from about 300 to 600 millimicrons.

As those skilled in the art will appreciate, fluorescent materials are generally very well known. These conventionally and for purposes of this invention may be materials which can be dispersed or dissolved in an appropriate solvent binder, or other carrier. It will be appreciated that the characteristic wave lengths of the emitted photon radiation may vary from one fluorescent material to another extending from the ultraviolet portion of the spectrum through the visible and into the infrared so that for best utilization of fluorescent materials in the processes of this invention an appropriate matching of the wave length of the emitted radiation with the radiation absorption characteristics of the imaging system and the spectral sensitivity of the radiation detector is desirable and preferred.

As those skilled in the art will appreciate, in a scintillator composition the solvent comprises up to at least about 80 or even higher weight percentage of the total scintillator composition. The solute is distributed throughout the solvent uniformly on a molecular basis. One common class of solvent materials includes polymers such as polystyrene, methyl cellulose, polyvinyl acetate, and the like which are soluble in organic liquids. Thus, in such cases it is convenient to dissolve both the scintillator materials and the polymer materials in such an organic liquid and then coat the resulting liquid mixture in layered fashion to a desired thickness upon a medium construction of the invention. When the organic liquid is evaporated, there remains the scintillator material dissolved in the polymer. Another common class of solvent materials comprise melt-extrudable polymers such as polyethylene terephthalate; here the scintillators are dispersed in the molten polymer before the same is extruded and cooled.

In general, a recording medium of this invention can employ any substantially nonfluorescent, grain-free organic imaging material provided such material is capable of selectively altering by at least 10% its capacity to transmit that characteristic photon energy emitted by the associated fluorescent material in such medium when electron excited after such imaging material is exposed to at least 10 joules per square centimeter of actinic radiation applied normally to a surface thereof.

In general, such imaging materials are well known to those skilled in the art. For convenience and reference purposes various classes of these imaging materials are summarized in the following Table I. In this table, the term "imaging process" has reference to the manner in which an image is formed by a physical or chemical change in a given medium construction. Exposure is generally prolonged until the image material has undergone a change sufficient to effect the desired recordation of information. The term "development" has reference to a particular chemical or physical process by which the change or alteration in image material created during exposure to actinic radiation is detected and amplified. Development may (a) require a second, separate, and subsequent processing step following exposure, or (b) occur simultaneously with, or as a direct and dependent consequence, of exposure to actinic radiation. The term "fixing" has reference to a process step subsequent to development which produces desensitization of areas in an image material to subsequent or further exposure to actinic radiation. Depending on the nature of the phenomena utilized, development and/or fixing may not be necessary, may be eliminated, or may even be accomplished simultaneously with one another.

TABLE I.—FUNCTIONAL DESCRIPTIONS OF IMAGING PROCESS STEPS WITH DIFFERENT IMAGING SYSTEMS

| I. Imaging process | II. Development | III. Fix | IV. References |
|---|---|---|---|
| (1) Destroy a reactant | Chemical reaction forming a visibly distinct product in nonexposed areas. | Not needed | Diazo-Bruning, Ozalid.[1] |
| (2) Photodecomposition producing gaseous products in a thermoplastic film. | Heat to expand gas within softened film producing light scattering bubbles. | Exposure to uniform photon energy. | Vesicular Diazo.[2] |
| (3) Create a heat pattern (localized increase in temperature). | Heat sensitive physical or chemical change to produce a visibly distinct product. | Background is heat sensitive unless "fixed." | Thermography.[3] |
| (4) Create a pattern of a chemical reactant | Transfer and chemical reaction to yield a visibly distinct product. | Not needed | Sympathetic ink.[4] |
| (5) Generate acidic reactant | Conversion of basic dye to acid form | do | Described herein below. |
| (6) Producing structural rearrangement | Photochromatic (conversion of one chemical species to different chemical species). | do | Photochromic micro-image (PCMI).[5] |
| (7) Free radical generation | Synthesis of photon absorbing material | Heat | Wainer reaction.[6] |

[1] U.S. Patent Nos. 2,829,976; 2,807,545; 2,755,185; 2,774,669; 2,691,587.
[2] U.S. Patent No. 2,950,194.
[3] U.S. Patent No. 2,740,896.
[4] British Patent No. 844,077; 844,079; 844,256; Niepce de St. Victor, Photographic News 2 (1859).
[5] Y. Hirshberg, J. Chem. Phys. 27, 758 (1957); South Africa Patent No. 61,861; French Patent No. 1,272,059; Belgium Patent No. 607,355; British Patent Nos. 887,958; 88,902, 883,803; U.S. Patent Nos. 3,090,687; 3,038,812; 3,020,171; 2,953,454; 3,022,318.
[6] U.S. Patent No. 3,042,515, R. H. Sprague and M. Roscow Photo Sci. & Eng. 8, 91 (1964); R. H. Sprague and It. L. Fitchter, ibid., p. 95; U.S. Patent No. 3,102,029.

The conventional diazo processes mentioned in Table I involves production of a colored azo dye. Exposure to actinic radiation of a stabilized diazonium compound destroys its ability to react with a coupler and hence produce a dye. In the unexposed areas the dye-forming reaction occurs readily upon the addition of an alkaline material (ammonium vapor) if the film already contains a coupler component or both an alkaline material and coupler.

In the so-called vesicular diazo process mentioned in Table I, actinic radiation exposure decomposes a diazonium salt dispersed in a thermoplastic binder. When the medium is subsequently heated, the nitrogen produced by the decomposition expands in the softened binder producing a vesicular, photon energy scattering image in the exposed areas.

In using infrared radiation for recording with media of this invention, one can employ an imaging material which characteristically requires relatively large quantities of actinic radiation in order to effect a desired change in photon energy transmission properties.

In Example 4 of Table I selective surface absorption or selective deposition can be used to create a differential chemical pattern of an imaging system component corresponding to that on the original graphic master. If the tinctorial power of the reaction product is high, or if the transferred material is a reaction catalyst, transfer of only very small amounts of material can provide a visible image. Thus, some degree of amplification may be possible.

For some time it has been known in the arts that upon exposure of highly halogenated polymers such as polyvinyl chloride or polyvinylidene chloride to actinic irradiation, one obtains acidic reaction products generated in the polymer matrix, directly as a result of the irradiation. If in such a polymer matrix there is incorporated the basic form of an acid-sensitive dye such as one of the commonly known indicator dyes such as phenolphthalein, then, upon exposure and generation of the acid component in the matrix, a color change is produced in the irradiated areas. When the indicator dye is selected so that its colored form is highly absorptive of the photon energy emitted by the fluorescent composition, a useful imaging system is obtained.

Photochromic materials are well known in the photochemical art. Such materials, when exposed to actinic radiation, undergo a structural rearrangement which results in the formation of a differently and usually more colored species, compared to the initial color. A wide variety of such compounds are included in the chemical class known as benzoindolinopyranospirane. Recently, the National Cash Register Company has developed a photochromic imaging system utilizing this general technology for the recording of grain-free microimages. Such an imaging system can be advantageously employed in making media of this invention.

The exposure to actinic radiation of highly halogenated alkanes, such as carbon tetrabromide, bromoform, or chloroform produces a highly chemically reactive radical. When, for example, a substituted aromatic amine is incorporated in close proximity thereto, upon subsquent heating an image is formed. The literature discloses that Horizons, Incorporated, has made practical utilization of this color forming reaction in preparation of radiation-sensitive recording compositions. These compositions, when suitably layered in combination with fluorescent composition, have value as media constructions of this invention.

Example 5 of Table I utilizes a dehydrohalogenation imaging system which employs a combination of two components: an acid sensitive indicator and a highly halogenated polymer. The acid sensitive indicator is capable of changing color at pH below about 7 while the highly halogenated polymer is capable of liberating an acid component. The halogenated polymer is normally solid and has a molecular weight of at least about 1,000 and further has at least 25% of labile halogen selected from the group consisting of chlorine and bromine. The indicator is generally homogeneously distributed throughout the halogenated polymeric binder, and is preferably dissolved therein. It may also be provided as a localized coating or be concentrated in the top surface of the polymeric binder in a particular medium construction. Preferably the polymers are soluble in conventional organic solvents. Solubility, of course, can be adjusted to some extent by employing copolymers, a balance being achieved between halogen content and copolymer solubility. Vinylidene chloride copolymers with such monomers as the aliphatic acrylates (e.g., n-butyl acrylate, methyl acrylate, ethyl acrylate, hexyl acrylate, methyl methacrylate, beta-chloroethyl acrylate, etc.), acrylonitrile, vinyl chloride, vinyl acetate, vinyl butyrate, etc. are preferred highly halogenated polymer systems. Ethylenically unsaturated monomers with a high halogen content, such as 1,1,3,3,3,-pentachloropropene-1, fluorotrichloroethylene, 1,1-difluoro-2,2-dichloroethylene, trichloroethylene, etc. copolymerized with vinyl or vinylidene chloride or bromide or with aliphatic acrylates can also be employed. Halogenated aromatic polymers are considerably less effective than the halogenated aliphatic polymers, although the copolymerization of a suitable halogenated aliphatic monomer with an aromatic monomer (e.g., styrene, vinyl toluene, vinyl carbazole, etc.), selected for its solubility characteristics is suitable.

Although the halogenated polymers are desirably deposited from solution as a film on a surface, they may also be deposited from a latex or intimate dispersion. With those polymers which tend to decompose slowly in the presence of ordinary light and atmospheric oxygen, antioxidants and other stabilizers may be added to improve good storage life.

Since the highly halogenated polymers serve as a relatively nonvolatile source of hydrohalic acid, no other brominated or chlorinated compounds which liberate acid under electron beam exposure are required for electron beam imaging.

The imaging material used in this invention may be prepared by mixing a minor amount of the acid sensitive indicator system with a solution of the highly halogenated polymer and backing. If a transparent imaging material is desired, it will be appreciated that many of the highly halogenated polymers are made more relatively light transmissive in the form of a thin film. For each equivalent weight of acid sensitive indicator from about 1 to about 1000 acid equivalents of the halogenated polymer are employed, although the ratio of these ingredients varies with the particular indicator system, and its acid sensitivity, which is employed. Other additives, e.g., plasticizers, oxidizing agents, etc., may be incorporated into the actinic radiation sensitive coating (preferably such additives are chosen so as not to liberate acid under the actinic radiation). Additional films or coating may be provided on the actinic radiation sensitive layer to protect it from abrasion, etc., provided they are relatively transmissive to the electron beam.

With imaging material such as just described, a color change therein is generally observed immediately after exposure to actinic radiation or shortly thereafter upon subsequent exposure to air thereby providing a visible imaging record in the imaging material. In some instances, when the acid sensitive indicator is reversible, as with the acid-base indicator dyes, the image can be erased by heating the imaging material to about 100° C. to 150° C. for approximately 30 seconds, the color change being probably due to the volatilization of the acid and an increase in effective pH of the imaging material. Erased image material of this type can be reused for recording with actinic radiation although subsequent depletion of the polymeric acid source eventually reduces the efficiency of recording.

It is sometimes convenient to leave the indicator out of a highly halogenated polymer film initially. Then after exposure of such film to actinic radiation, the liberated acid in the imaged (exposed) areas can be subsequently developed by contacting the exposed surface of the highly, halogenated polymer with the acid sensitive indicator system. A separate development roller or bath may be used for this post development step or a second medium construction incorporating or carrying the indicator can be physically brought into contact with the exposed surface of such medium. Such a post development procedure using an acid indicator containing film can be used to prepare multiple copies.

A simple standard test procedure to assist in the selection and definition of highly halogenated polymers and indicator systems useful in such recording medium employs ultra-violet light. The procedure is to add to a film forming halogenated polymer 5 milligrams of Congo red A to 1.0 milliliter of a 20 weight percent solution of such polymer, in a suitable solvent such as tetrahydrofuran. This solution is then knife coated onto a cellulose acetate, polyethylene terephthalate or glass backing to provide a dry film of 0.1 mil thickness. A sample of this dry film is placed at a sufficient distance from an ultraviolet light source to provide about 0.08 watt per square centimeter of radiant energy of 2000 to 3000 angstroms wavelength. The sample is irradiated for a period from 2 to 30 seconds. Generation of a blue color indicates a halogenated polymer containing "labile" halogen useful in the electron beam recording media of this invention. The same standard test procedure is modified for selection of a suitable acid sensitive indicator by using a 20 weight percent solution of vinylidene chloride-acrylonitrile copolymer (90/10 mol rato) and 5 milligrams of the acid sensitive indicator system, a strong color change after the ultraviolet exposure indicating a useful indicator for the electron beam recording media.

Reference is here had to Table 2 "Recording Methods and Conditions." It is seen that with the exception of processes 3 and 4 recordation may be accomplished by any one of several types of actinic radiation. Furthermore, provided that the actinic radiation is usefully absorbed, the amount of energy needed is to a good approximation independent of the actinic energy type. Thus, imaging process number six requires a maximal energy of about 0.1 joule/cm.[2] of actinic energy whether the source is an electron beam, ultraviolet light or $\gamma$-rays.

Electronic readout of the imaged media is carried out independently of the recording method. And in particular, the energy needed to accomplish readout is independent of the energy used for recording, provided the image created during recording is a useful one, i.e., photon absorptive to at least 10%. Typical readout conditions are 20 kv. acceleration potential, 10$\mu$ beam spot, 0.1$\mu$ amp beam current and $10^{-7}$ second dwell time.

TABLE 2.—RECORDING METHODS AND CONDITIONS

| Imaging process [1] | Maximal energy, joules/cm.[2] | Electron beam dwell time [2] (sec.) | Ultraviolet light | | $\gamma$-radiation exposure [4] | X-radiation exposure [5] | Infrared exposure [6] |
|---|---|---|---|---|---|---|---|
| | | | Source | Exposure [3] | | | |
| 1 | 1 | $10^{-5}$ | G.E. H100A4 | 20 cm., 60 sec. | 10 megarad | 10 megarad | |
| 2 | 10 | $10^{-4}$ | G.E. H100A4 | 20 cm., 600 sec. | do | 50 megarad | |
| 3 | 10 | $10^{-4}$ | | | | | 5 cm., 1 sec. |
| 4 | 10 | $10^{-4}$ | | | | | 5 cm., 1 sec. |
| 5 | .1 | $10^{-6}$ | G.E. GT4/1 | 15 cm., 100 sec. | 5 megarad | 5 megarad | |
| 6 | .1 | $10^{-6}$ | G.E. GT4/1 | 15 cm., 100 sec. | do | do | |
| 7 | .1 | $10^{-6}$ | G.E. GT4/1 | 15 cm., 100 sec. | do | do | |

[1] Cf. Table 1.
[2] 20 kv. acceleration potential, 10$\mu$ beam spot, 5$\mu$ amp beam current.
[3] The distance given in centimeters refers to the space between the source and the medium measured normally and the time in seconds which accompanies the distance figure refers to the duration of exposure.
[4] 0.75 mev. $\gamma$ rays from $U^{235}$ fission products obtained from Idaho Operations Office AEC.
[5] G.E. XRD-3 X-ray diffraction unit operated at 50 kv., 16 milliamp.
[6] Sylvania 120 v./330 watt halogen lamp 78-8454-3461-8 operated at 100 v.

As will be seen from the discussion hereinafter, it is preferred to construct media of this invention so as to have incorporated therein a layer of an electrically conductive material. By "conductive material" as used in this application, reference is had to substances such as aluminum, copper, silver, carbon particles, etc., which conduct electrons when in the form of a continuous film or a particulate layer. Preferably a layer of conductive material is so associated with the fluorescent material in a medium construction so as to be able to drain off electrons when such conductive layer is grounded and thereby provide minimum electrical differential between a medium and the surrounding environment. In some media constructions, the conductive layer may be photon energy and/or actinic radiation transmissive. Thus, vacuum-vapor deposited layers of aluminum, silver, gold, copper, or the like can be made transmissive of visible light, for example.

Owing to the fact that the imaging material, the fluorescent material and the conductive material (if present) are each initially present in a medium construction of the invention in some form which has poor tensile strength characteristics, it is usually convenient and highly desirable to provide a sheet-like storage medium of the invention with a backing or supporting layer so that an entire medium in any given construction could be handled, stored, etc., with ease as those skilled in the art will readily appreciate. In fact, it is preferred to practice this invention using supported media. When the imaging material layer, the fluorescent material layer and any conductive layer present are in themselves self-supporting, it generally is not necessary to employ an additional supporting or backing layer.

Suitable backing materials for use in media of the present invention include glass, ceramics and vitreous materials, metal (e.g., aluminum foil), paper, film forming organic polymers, and the like. Examples of film forming organic polymers suitable for use in this invention include polyethylene terephthalate and other polyesters, polystyrene, and other vinyl polymers, cellulose esters (including cellulose acetate, cellulose propionate, cellulose butyrate and the like), etc. A backing material can be transparent or selectively transmissive of particular forms of radiation, depending upon the particular end use intended for a given medium.

It will be appreciated that media of the present invention may also utilize various other types of materials. Thus, for example, as those skilled in the art of imaging materials will appreciate, depending on the physical and chemical characteristics of adjoining layers in a medium construction, it is commonly desirable to incorporate subbing or priming materials to facilitate anchorage of one material to another.

Conventional methods of preparation are generally used to make the media of this invention. Most usually, the imaging material is dissolved or dispersed on a molecular basis in a suitable liquid carrier which mixture is then metered out uniformly over some sort of preformed backing member. This backing member can be any of the types of materials above described; it can contain incorporated therein the fluorescent material as taught for example by the method of U.S. Patent No. 2,037,793. Instead of metering such a solution onto a preformed backing, the soluion itself can be cast as a film so that the imaging material forms its own backing or support.

It is convenient to deposit as by vacuum-vapor deposition, a metal vapor coating or the like to form a conductive material layer on the medium being constructed, if a conductive material layer is to be employed. One preferred procedure is to place a conductive material layer on a backing member before coating such backing member with a layer of an imaging material.

A medium being constructed can be coated with a solution containing the fluorescent material dissolved therein, if such material is not already incorporated elsewhere into the construction (e.g., the fluorescent material could be incorporated into the backing).

Since the methods of construction are in general conventional and obvious to those skilled in the art and are illustrated by the preparatory examples given below, it is believed that this specification need not be burdened with a more detailed recital of general preparatory procedures for media construction.

When one constructs a medium for electron beam recording, one procedure is to select an imagining system which will produce a significant alteration in photon energy transmission rates during the exposure interval provided by a particular recording process using the particular type of differential radiation. Once such an appropriate imaging material has been chosen one selects a fluorescent material which has a characteristic photon emission at the frequency band which has been made opaque during recordation in the imaging material. For instance, a colored material which is yellow before recordation and red afterwards is absorbing green light in the red areas. Therefore, one selects a fluorescent material which fluoresces in the green region. This means that in the yellow unrecorded areas, the green light is being transmitted while in the red recorded areas the green light is absorbed. Therefore, the differential photon energy output from a medium being readout is maximized. In general, it is always preferred to so construct a medium to maximize the amount of opacity created during recording at the wave lengths emitted by the fluorescent material.

Media of this invention can be considered to contain two essential functional components, each of which is always found in any given medium of this invention. One of these functional components has been termed the fluorescent material; the other, the imagining material. However, in addition to these two components, media of the invention may contain additional or auxiliary components, depending upon the particular use application and the type of construction. For example, under certain circumstances it may be deisrable to incorporate in a recording medium an electrically conductive layer so that accumulated electric charge may be readily grounded and bledoff. While either the fluorescent material or imaging material may constitute a self-supporting film, often it is desirable to incorporate a separate flexible or rigid backing member into a medium construction.

Figure 1B:
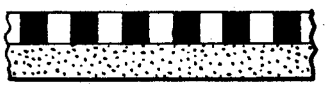
Figure 2A:
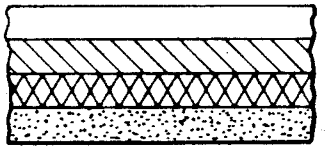
Figure 2B:
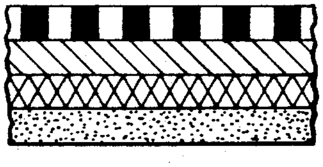

Referring to FIGURES 1–3, it will be readily appreciated that a number of different media embodiments can be constructed within the teachings of this invention. It will be appreciated that these figures are organized in a columnar fashion; the left hand column shows the media as initially prepared. Thus, reference is had to FIGURE 1A, FIGURE 2A, and FIGURE 3A. The right hand column shows the appearance of the media after they have been exposed to differential actinic radiation and thus have recorded therein information. If necessary or desirable in an individual case, developing and fixing have already been accomplished. Thus, the right hand column includes FIGURE 1B, FIGURE 2B and FIGURE 3B.

It will be appreciated that the FIGURES 1–3 are illustrative of characteristic types of media of the invention and are not exhaustive of the various ways in which the functional components together with the auxiliary components can be combined and used together to form media of this invention.

There is seen in FIGURE 1 a two-layer medium construction which has an imaging material layer uniformly placed next to a fluorescent material layer. In this construction a transparent conductive material is placed either on the exposed surface of the imaging material layer or on the exposed surface of the fluorescent material layer. It will be appreciated that any combination of these materials can be employed. Thus, for example, one can have two conductive layers or a laminated two-component backing member.

The imaging material layer may consist of an imaging material homogeneously dispersed or dissolved in an inert binder. The binder may play a role in the imaging process or the imaging material layer may be film forming and have no separate binder. After recording, and following any necessary development and/or fixing, the imaging layer acts as a mask, opacifier or quencher to the characteristic photon energy emitted by the adjacent fluorescent layer. The photon absorbing layers which constitute this mask may extend to the surface of the fluorescent layer, for example, FIGURE 1B, or the photon absorbing layers may extend only part way through the imaging layer. This combination of layers with or without a conductive layer may be placed on a backing member. The backing member may or may not be transparent to the characteristic photon energy emitted by the fluorescent layer. The fluorescent layer may be a uniform dispersion or solution of a photoemissive material in an inert binder. The binder may be directly involved in the photoemission or there may be effectively no separate binder in the system. As indicated above, it is preferred that the characteristic photon energy emitted by the fluorescent layer lie within a relatively narrow band of wave lengths and be of relatively high intensity. For example, a fluorescent layer composed of 4-dimethylaminochalcone dissolved in polystyrene emits light between 480 to 530 millimicrons.

Turning to FIGURE 2, there is seen a three-layer medium construction wherein the fluorescent material and the imaging material are each in a layer form, separated one from the other by a spacer or supporting layer. The spacer layer needs to be at least partially transmissive of the photon energy characteristically associated with the fluorescent material when excited. The spacer layer can be in actual fact a backing member, a conductive layer, some combination of these, and may itself be coated on either of its spaced, generally parallel faces with other coating materials such as subbing materials and the like.

The imaging layer in this construction functions in an analogous manner to the imaging layer described in the two-layer construction. Likewise, the fluorescent layer functions as described above as a source of photon energy. In general, in media constructions of this invention, the layer of fluorescent material can be substantially nontransparent of photon energy except for its own characteristic photon emission frequency when excited, and the layer of imaging material can be substantially non-transmissive of photon energy except for photon energy having the characteristic photon emission frequency associated with the fluorescent material layer in a given medium construction (e.g., the nonimaged areas in an imaging layer must be substantially transmissive of the characteristic photon energy emission of the fluorescent material layer).

Referring to FIGURE 3, there is seen a medium construction which employs typically a mixture (i.e. in a solution or the like) of the imaging material and the fluorescent material. Conveniently these materials are homogeneously dispersed or dissolved in a polymeric binder material. This binder material may or may not be important to either the imaging process, the fluorescent process or both processes. Such binder may be substantially inert as respects either the fluorescent material or the imaging material and serves simply as a means for holding physically the fluorescent material and the imaging material together in a matrix so as to constitute a medium of the invention. In this type of construction, it is desirable to so asemble the component materials that when information is recorded in such a medium and the medium is thereafter developed and fixed (if necessary) there are produced photon absorptive areas in a uniformly fluorescent continuum.

It will be appreciated that in the composite medium it is difficult, if not impossible, to specify the exact mechanism by which the photon absorptive areas operate to selectively reduce emission. The result may be a combination of both masking and quenching, the former being absorption of the characteristic photon emission of the fluorescent material, and the latter a deactivation of the fluorescent material's excited state, the known fluorescent precursor.

A backing or supporting layer may be incorporated adjacent to the conductive layer. This backing layer also may be transparent or partially transparent or even nontransparent to actinic radiation. When either a layer of backing material or a layer of conductive material or some combination of these is positioned between a layer of fluorescent material and a layer of imaging material in a medium construction such layer or layers are so chosen as together to be capable of transmitting therethrough at least 10% of the photon energy emitted by the fluorescent material when such is excited to emit photon energy (during a readout process).

In any given medium construction, the interrelationship between layers is such that the imaging material layer is adapted to form at least a latent image (i.e., a latent imagewise recording of information) upon exposure to a source of differential actinic energy. In such a construction such interrelationship is also such that the imaging layer is adapted to be developed and/or fixed, if desired or necessary, following exposure to such an energy source. Also in such a construction such interrelationship is such that the fluorescent layer is adapted to emit photon energy when one face of a medium is bombarded by uniform actinic energy of predetermined minimum average energy (such energy requirement being determined as a practical matter by equipment considerations and the like).

For purposes of this invention, light transmission can be measured by means of a Welch Desichron, Catalogue No. 2150, manufactured by the W. M. Welch Scientific Company, 1515 Sedwich St., Chicago 10, Ill. This instrument is adjusted to read 100% light transmission on exposure of the light-sensing electronic phototube to room lighting. A sample of the material to be measured for light transmission is then placed on the orifice of the light-sensing probe and a light transmision measurement is made by reading the scale of the meter.

In a preferred medium construction of this invention there is employed a layer of conductive material in the form of a continuous film which has a surface resistance less than about $1^{08}$ ohms per square. Preferably, such layer has a thickness not greater than about 4,000 A. and in no event is such a layer thicker than about 000.1 mil. Such a layer is conveniently deposited upon a face of a medium being constructed either by conventional vacuum vapor deposition techniques or by conventional electrolytic deposition techniques. For purposes of this invention, surface resistance in terms of ohms per square can be measured by attaching electrodes to opposite sides of a square of the conductive layer under measurement. The electrodes are part of the resistance-measuring instrument. The measured resistance of the square is independent of the size of this square. In measuring the surface resistance of the conductive layer in this media, care must be exercised that contact is made with the conductive layer and not with any other layer as these other layers are essentially insulating.

A preferred recording medium construction of this invention integrally comprises a layer of imaging material, a layer of fluorescent material, a layer of electrically conductive material, and a layer of supporting material. The imaging material layer is distinct from the other layers, and each of the other layers is on the same side of the imaging layer and in any sequence.

An especially preferred class of media within the teachings of the present invention is one capable of recording information at a bit density greater than about $10^6$ bits of information per square millimeter of surface area and further capable of being read out with signal-to-noise ratio exceeding about 10:1.

Media of the invention incorporating a backing layer and which are thin enough to be electron transparent provide the capability of being read out by an unmodulated scanning focused electron beam bombardment through the backing layer so as to excite the fluorescent material layer in a medium construction to emit photon energy without having to excite the fluorescent material layer by electron beam bombardment against or through the masking layer.

Many of the afore-described imaging materials require no special chemical development, fixing, wet processing, or the like following a recording operation. The elimination of these time consuming and expensive steps means that in many cases recorded information is capable of real-time readout. Classes of imaging materials above described which require no processing after recordation and which are thus suited for use in real-time readout applications include (referring to Table I above) media designated by numbers 3, 5, 6 and 7. Imaging materials which are capable of real-time readout when used in media constructions of this invention constitute a preferred class of imaging materials.

As a practical matter which those skilled in the art will readily comprehend, there are three principal parameters which determine the performance of a recording medium of this invention in any given use situation, as follows: Fluorescence decay time, fluorescence conversion factor, and sensitivity of the imaging material. "Fluorescence decay time" is the time necessary for a steady state fluorescence photon energy output to decrease to about 37% of its steady state value following removal of excitation energy. "Fluorescence conversion factor" is the percent conversion of input actinic energy into output photon energy. "Imaging material sensitivity" is the amount of developed opacity produced or destroyed by a given amount of recordation energy (e.g. developed optical density per joule per square centimeter). These parameters are chosen so as to obtain a given recording medium which is suited for a given recording and readout applicational use.

In general, a faithful electronic readout of the recorded image requires the fluorescence decay time of the fluorecsent material to be less than the dwell time of the readout electron beam, $$\frac{\text{delay time}}{\text{dwell time}} \text{ less than } 1$$

Readout of a single track recording $10\mu$ wide and 0.5 centimeter long at 1 megacycle/second with an electron beam having a $10\mu$ diameter spot size is equivalent to readout with a $5\times10^{-7}$ second dwell time. Likewise a 5 megacycle/second (mc.) readout is equivalent to a $10^{-7}$ second dwell time. Thus, to be useful for readout at a 1 mc. rate, the fluorescence decay time must be less than $5\times10^{-7}$ second, and less than $10^{-7}$ second to be useful for 5 mc. readout. Grain free organic materials in general and grain free organic scintillators in particular have decay times less than $10^{-8}$ second, and represent a particularly useful class of fluorescent materials useful for high speed readout.

Although the fluorescence decay time is of prime importance in determining readout rate, it is of secondary importance in determining readout quality. Readout quality is dependent upon the fluorescence conversion factor and the recorded image quality. Since the light collection and amplification circuitry used for readout have an intrinsic background noise, sufficient light must be collected to allow operation at levels well above noise. A high conversion factor guaranatees that this level will be reached. Theoretically, when reading out at high frequencies (i.e., 1–5 mc.) approximately $10^{-7}$ watts of photon power arriving at the phototube is sufficient to allow a signal output at least 10 times greater than the background noise. Since $10^{-3}$ watts of power is the maximum amount which may be delivered by the electron beam of $10\mu$ spot size and $10^{-7}$ second dwell time to the fluorescent layer without significant radiation damage a conversion efficiency of $10^{-7}/10^{-3}=10^{-4}$ would be required if all the photon power generated in the fluorescent layer arrived at the phototube. In actual practice about 1% of the light is collected by the phototube and conversion factors of greater than $10^{-2}$ are required. The grain free organic scintillators are a preferred class of materials since they have conversion factors greater than $10^{-2}$.

The most common failing of grain free imaging materials for use in high speed recording is poor image contrast because of low sensitivity. Because of technical limitations, no more than about 0.1 joule/square centimeter may be placed in an electron beam of 10$\mu$ diameter having a dwell time of $10^{-7}$ second (5 mc.). Thus, only those grain free media having sufficient sensitivity to give a photon absorption change of at least about 10% when subjected to 0.1 joule/square centimeter are useful for recording at 5 mc. Referring to Table I, imaging processes 1, 3, 5, 6 and 7 (cf. Table 2) have been found to be sufficiently sensitive to record at high rates (i.e., 1–5 mc.).

The media of this invention are used for high density storage of information. The information so recorded may be read out using any one of a number of methods, especially by means of a scanning electron beam or by means of a uniform or sequentially generated source of radiant energy. During readout the fluorescent layer is excited to exhibit its characteristic photon energy output. This output is attenuated in an imagewise manner by the imaging layer and then detected visually, optically or electronically. Usually the media of this invention are used in conjunction with conventional electronic equipment such as photomultiplier tubes, ultraviolet light sources, scanning electron beam equipment and associated circuitry. Readout may be either visual (optical) or electronic. In optical readout the image, may, for example, be projected as for display on a screen or production of enlarged hard copy. In electronic detection a serially generated photon energy output may be detected, for example, by a photomultiplier tube, then amplified and displayed, for example, on a suitable television-type monitor or utilized in a video facsimile recorder.

The invention is further illustrated by the following examples:

EXAMPLE 1

A 0.25 mil polyethylene terephthalate polyester film containing 2% by weight of molecularly dispersed 4-dimethylaminochalcone is prepared by melt casting on an extrusion coater. The dry ingredients, 4-dimethylaminochalcone and resin were blended for two hours, heated at about 200° C. and the melt is extrusion cast onto a casting roller. A solution is then prepared by mixing the following materials—1.1 grams citric acid, 0.5 gram thiourea, 0.3 gram 3,5-resorcylic acid amide, 0.15 gram p-diethylaminobenzenediazonium hexafluorophosphate, 2.2 grams polyvinyl acetate, 2.2 grams cellulose acetate and 40 grams acetone. This solution is knife coated onto said polyester film and air dried to give an imaging layer having a dry thickness of about 0.2 mil.

This medium construction (FIGURE 1A) is placed in a vacuum chamber and the imaging layer irradiated with a scanning electron beam having a 10$\mu$ spot diameter, 5$\mu$ amp current, $10^{-5}$ second dwell time and 20 kv. acceleration potential. After removal from vacuum, the medium is held 1 second at room temperature immersed in the moist ammonia fumes above a layer of concentrated ammonium hydroxide solution contained in a beaker.

Substantially instantly a red image corresponding to the raster created by the electron beam appears in the non-electron beam struck areas. This red image has an optical density to transmitted white light of 0.7, compared to 0.1 for electron beam struck areas.

This same medium is imaged by exposure to a mercury lamp such that it receives 0.7 joule/square centimeter of radiant energy of which at least 20% is in the region of wavelengths between 3500–4000 A. This is conveniently accomplished by a 60 second exposure at 20 cm. from a General Electric H100A4 mercury lamp. Development with ammonia vapors as before yields a red image having an optical density of 0.7.

For electronic readout, the imaged medium (FIGURE 1B) is placed in vacuum with the polyethylene terephthalate fluorescent layer facing the electron source and a R.C.A. 8054 photomultiplier tube positioned in vacuum 2 inches from the medium, on a line coaxial with the electron source but on the opposite side of the medium with respect to said source.

The fluorescent layer is irradiated with a television type raster created by a scanning electron beam defined by the following parameters. A 10$\mu$ beam diameter, 0.1$\mu$ ampere beam current, $10^{-7}$ second dwell time and 20 kv. acceleration potential. The differential light signal reaching the photo tube is amplified and displayed on a television monitor.

The display obtained from a medium which had been recorded using a scanning electron beam is a faithful reproduction of the scan line pattern. These lines are plainly evident with sharp edges and excellent contrast. A similar display obtained from a mercury lamp imaged recording is likewise a faithful reproduction of the original recording light pattern.

This electronic readout is done repeatedly with no loss in image quality provided sufficient time between readouts is allowed for the medium to discharge.

EXAMPLE 2

To a warm solution prepared by dissolving 16 grams of polyvinylidene chloride-acrylonitrile copolymer (Saran F120, a product of the Dow Chemical Company), and 4 grams of polymethylmethacrylate in methyl ethyl ketone heated to 50° C. is added a solution of p-dimethylaminobenzenediazonium zinc chloride in 20 grams of 1:1 ratio by volume of methanol and methyl ethyl ketone, also heated to 50° C. before addition. This solution of imaging material is knife coated onto a 0.5 mil polyethylene terephthalate backing prepared by extrusion as above in Example 1 and containing 2% by weight of dissolved p-terphenyl. After air drying, the imaging layer has a coating thickness of about 0.5 mil. The film (FIGURE 1A) placed in vacuum and recorded as above with an electron beam of 10 joules/square centimeter energy (20 kv., 10$\mu$ amp, 5$\mu$ beam spot, $5\times10^{-4}$ second dwell time). It is removed from vacuum and heated for 1–5 seconds at 180° F. to develop a vesicular image made up of expanded areas caused by nitrogen evolution.

Electronic readout of the imaged medium (FIGURE 1B) is accomplished by irradiating the fluorescent layer, positioned as in the above Example 1, with the television type beam raster.

EXAMPLE 3

A 0.25 mil film of polyethylene terephthalate polyester containing 2% by weight of dissolved 4-dimethylaminochalcone is prepared by extrusion casting as in the above Example 1. Onto it is knife coated a solution of imaging material composed of 20% by weight vinylidene chloride/n-butyl acrylate copolymer (88:12 mole ratio of vinylidene chloride to n-butyl acrylate) in tetrahydrofuran and 20% by weight of 4-phenylazodiphenylamine dye. The air dried imaging material has a thickness of 0.1 mil so the total thickness of the construction is about 0.35 mil. Recordation with 0.02 joule/square centimeter of electron beam energy yields a red image with an optical density to transmitted white light of 0.3 compared to 0.1 for the yellow background. This media when exposed to ultraviolet light of 2537 A. wavelength for 100 seconds at a distance of 15 centimeters from a G.E. GT4/1 mercury lamp develops a red image having an optical density of about 1.0 compared to the yellow background. When exposed to 5 megarads of $\gamma$-radiation it achieves an optical density of 2.0 compared to the background. Electronic readout is also accomplished as in the above Example 2.

EXAMPLE 4

Onto a 0.25 mil film of polyethylene terephthalate polyester containing 2% by weight of dissolved perylene and prepared as in Example 1 is coated and then air dried an imaging layer from a solution prepared by adding to a 10% by weight solution of polymethyl methacrylate in methyl ethyl ketone 0.5% by weight of 6-nitrobenzo-1,2,2 trimethylindolinopyranospirane. The imaging layer has a dry thicknes of about 0.2 mil.

The medium construction (FIGURE 1A) was placed in vacuum and recorded as in Example 1 by an electron beam (cf. Table 2). The magenta image produced on recordation had an optical density of about 0.5 to transmitted white light. After standing at room temperature for 24 hours, the magenta image had disappeared. This erasure is speeded up by irradiation with strong green-yellow light.

Electronic readout is carried out as in Example 1 and the display on the television monitor is equivalent quality to that obtained in Example 1.

EXAMPLE 5

To a 10% by weight solution of Butvar B76 polyvinyl butyral resin made by the Shawmigan Chemical Company in 1:1 acetone-ethyl acetate is added 10% by weight of indole and 10% by weight of carbon tetrabromide. This solution is coated onto a 0.25 mil polyethylene terephthalate polyester film prepared as in Example 1 containing 2% 4-dimethylaminochalcone so that after air drying it has a thickness of about 0.1 mil. After recordation as in Example 1 by an electron beam (cf. Table 2) the film is removed from vacuum and heated for 1 minute at 100° C. to develop the image and drive off unreacted carbon tetrabromide.

The orange image so produced has an optical density to transmitted white light of 0.4.

Electronic readout as in Example 1 yields a television monitor display of equal quality to Example 1.

When the polyethylene terephthalate polyester film has a vapor coat less than 10% transparent to light and the imaging materials of Example 1 are coated onto the non-vapor coated side of the polyester film, electronic readout is carried out by placing the photomultiplier tube on the same side of the medium as the electron source. Excellent fidelity of reproduction is obtained.

EXAMPLES 6–10

In Examples 1 through 5 the fluorescent polyethylene terephthalate polyester film of each respective example is uniformly vacuum vapor coated prior to coating with the respective solution of imaging material on one face thereof with aluminum so that it is 10—90% transparent to light. The imaging material is then coated on the vapor coated face of such polyester film.

When the polyethylene terephthalate polyester film has a vapor coat less than 10% transparent to light, the imaging materials of Examples 1 through 5 are coated onto the non-vapor coated face of the polyester film.

Recordation is carried out as per the procedure of Example 1 with similar results. Electronic readout is carried out as per the procedure of Example 1 with similar results except that when heavy vapor coats of aluminum are used (10–50% light transmissive), the light collected by the phototube is somewhat reduced and the amplifier must be operated at higher gain in order to produce a television monitor display with good contrast.

EXAMPLE 11

To a 20% by weight solution of polystyrene in toluene is added 3% by weight of 4-dimethylaminochalcone. This solution is coated onto a 0.15 mil polyethylene terephthalate film (Du Pont Mylar) so that on air drying the coated film thickness is about 0.1 mil. A solution prepared as in Example 1, citric acid, etc., is then coated onto the other face of such polyester film so that it has a dry thickness of 0.1 mil. Thus the final thickness of this three-layer construction is 0.35 mil.

This medium construction (see FIGURE 2A of the drawings) is placed in vacuum and the imaging layer irradiated with a scanning electron beam having a 10$\mu$ spot diameter, 5$\mu$ amp current, 10$\mu$ second dwell time and 20 kv. acceleration potential. After removal from vacuum and development with ammonia as in Example 1, a red image appears.

Electronic readout as in Example 1 provided a similarly excellent display on the television monitor.

EXAMPLE 12

A solution of imaging material is prepared as in Example 2 and coated onto a 0.2 mil polyethylene terephthalate polyester film (Du Pont Mylar) so that on air drying the coating thickness is about 0.2 mil. Onto the other face of such polyester film is knife coated and then air dried at 20% by weight solution of polyvinyl acetate in methyl ethyl ketone containing 2% by weight p-terphenyl. This fluorescent layer has a dry thickness of about 0.2 mil. Thus the final thickness of this three-layer construction is about 0.6 mil.

The conditions for electron beam recording and readout were identical to those used in Example 2 and the results of both recording and readout were identical in both examples.

EXAMPLE 13

To a 20% solution of polystyrene in toluene is added 2% by weight of 4-dimethylaminochalcone. This yellow solution is knife coated onto a 0.15 mil polyethylene terephthalate film (Du Pont Mylar). After air drying the polystyrene film has a thickness of 0.1 mil.

To a 20% by weight solution of vinylidene chloride/n-butyl acrylate copolymer (88:12 mole ratio) in tetrahydrofuran is added 10% by weight (based on polymer) on N,N-dimethyl-p-phenylazoaniline. This second solution is coated onto the other face of such polyester film, and on air drying it has a thickness of 0.1 mil.

Electron beam recordation and readout is carried out as in Example 3 and similar results are obtained.

EXAMPLE 14

To a 10% by weight solution of polymethylmethacrylate in methyl ethyl ketone is added 1% by weight of 6′-nitrobenzo-1,3,3-trimethylindoline - pyranospirane. This solution is knife coated onto a 0.2 mil polyethylene terephthalate (Du Pont Mylar) film to yield a coating when air dried which has a thickness of 0.2 mil. Onto the other face of such polyester film is knife coated a 15% by weight solution of polystyrene in toluene containing 0.5% by weight of dissolved perylene. On drying this film has a thickness of 0.1 mil so that the final over-all thickness of this three-layer construction is about 0.5 mil.

Electron beam recordation and readout is carried out as in Example 4 and similar results are obtained.

EXAMPLE 15

To a 10% by weight solution of Butvar B76 polyvinylbutyral resin made by the Shawinigan Chemical Company in 1:1 acetone ethyl acetate is added 10% by weight of indole and 10% by weight of carbon tetrabromide. This solution is knife coated onto a 0.15 mil polyethylene terephthalate film backing (Du Pont Mylar) so that after air drying, the Butvar film has a thickness of 0.1 mil.

A 15% by weight solution of polymethyl methacrylate in tetrahydrofuran containing 3% by weight of dissolved 4-dimethylaminochalcone is knife coated onto the other face of such polyester film and on air drying it has a thickness of about 0.1 mil. Thus, the over-all thickness of this three-layer construction is about 0.35 mil.

Recordation and readout is carried out as in Example 5 and similar results are obtained.

EXAMPLE 16

To a 20% by weight solution of polystyrene in toluene is added 3% by weight of 4-dimethylaminochalone. This yellow solution is knife coated onto the aluminum side of a 0.15 mil polyethylene terephthalate film (Du Pont Mylar) which had one of its faces coated with aluminum using standard vapor coating technique so that it was 50% transmissive to light. On drying, the polystyrene layer had a thickness of about 0.1 mil. A solution prepared as in Example 1, citric acid, etc., is then knife coated onto the other face of such Mylar film so that it has a dry thickness of 0.1 mil. Thus, the final thickness of this multilayered construction is about 0.35 mil.

This medium construction is placed in vacuum and the imaging layer irradiated as in Example 11. After removal from vacuum and development with ammonia as in Example 1, a red image appears. Electronic readout as in Example 1 yields a similarly excellent display on the television monitor.

EXAMPLE 17

A solution of imaging material is prepared as in Example 2 and knife coated onto the aluminum side of a 0.2 mil polyethylene terephthalate film (Du Pont Mylar) which had one of its faces coated with aluminum as in the above Example 16, so that on air drying, the coating thickness of the imaging layer is about 0.2 mil. Onto the other face of such Mylar film is knife coated and then air dried a 20% by weight solution of polyvinyl acetate in methyl ethyl ketone containing 2% by weight of p-terphenyl. This fluorescent layer has a dry thickness of about 0.2 mil.

This construction was placed in vacuum and recorded with a scanning electron beam as in Example 2. After development as in Example 2, the medium was again placed in vacuum and readout as in Example 1. An excellent display appeared on the television monitor.

EXAMPLE 18

To a 20% by weight solution of vinylidene chloride/n-butyl acrylate (88:12 mole ratio) in tetrahydrofuran is added 10% by weight (based on polymer) of 4-phenylazodiphenylamine. This solution is knife coated onto the aluminum side of a 0.2 mil polyethylene terephthalate film (Du Pont Mylar) which had one of its faces coated with aluminum as in the above Example 16, so that on air drying, the coating thickness of the imaging layer is about 0.1 mil. A solution of fluorescent material is made up by adding 20% by weight of 4-dimethylaminochalcone to a 20% solution of polystyrene in toluene. This fluorescent solution is knife coated onto the other face of such Mylar film so that upon air drying it has a thickness of 0.1 mil.

Recording and readout of this construction is carried out as in Example 3. The results obtained were identical to those obtained in Example 3.

EXAMPLE 19

To a 10% by weight solution of polymethyl methacrylate in methyl ethyl ketone is added 1% by weight of 6-nitrobenzo-1,3,3-trimethylindoline-pyranospirane. This solution is knife coated onto a 0.15 mil polyethylene terephthalate film (Du Pont Mylar) which had one of its faces coated with aluminum as in the above Example 16, to yield an air dried coating of 0.2 mil thickness. Onto the other face of such polyester film is knife coated a 15% by weight solution of polystyrene in toluene containing 0.5% by weight of perylene. On air drying this yellow fluorescent film has a thickness of 0.1 mil.

Electron beam recordation and readout is carried out as per Example 4 and similar results are obtained.

EXAMPLE 20

A 15% by weight solution of polymethyl methacrylate in tetrahydrofuran containing 3% by weight of dissolved 4-dimethylaminochalcone is knife coated onto the aluminum side of a 0.2 mil polyethylene terephthalate film (Du Pont Mylar) which had one of its faces coated with aluminum as in the above Exmaple 16, so that on air drying, this fluorescent layer has a thickness of 0.1 mil.

To a 10% by weight solution of Butvar B76 polyvinylbutyral resin (Shawinigan Chemical Co.) in 1:1 acetone ethylacetate is added 10% by weight of indole and 10% by weight of carbon tetrabromide. This imaging solution is knife coated onto the other face of such Mylar film so that upon air drying, it has a thickness of 0.1 mil. Recording and readout of this construction are carried out as described in Example 5, and similar results are obtained.

EXAMPLE 21

To a 10% by weight solution of Butvar B76 polyvinylbutyral resin (Shawinigan Chemical Co.) in 1:1 ethyl acetate-acetone is added 10% by weight of leuco pararosaniline, 10% by weight of carbon tetrabromide and 5% by weight of 4-dimethylaminochalcone. This solution is knife coated and air dried onto a paper support to produce a layer having a dry thickness of 0.1 mil. Recordation development and readout are carried out as in Example 5 and similar results are obtained. However, the photomultiplier tube is positioned on the same side of the imaging layer as the electron beam source.

EXAMPLE 22

To a 15% solution of polyvinyl toluene in toluene is added 3% by weight of 2,5-diphenyloxazole, 10% by weight of hexachloroethane and 10% by weight of Rhodamine B leuco cyanide. This solution is knife coated onto the aluminum vapor coated side of a 3 mil polyester film so that on air drying the film has a thickness of about 0.5 mil. Recordation development and readout are carried out as per Example 21. This readout is comparable in quality to that obtained in Example 5.

EXAMPLE 23

To a 10% by weight solution of polyvinyl acetate in methyl ethyl ketone is added 2% by weight of anthracene, 10% by weight of leuco malachite green and 10% by weight of carbon tetrabromide. This solution is knife coated onto a 0.2 mil polyester film so that on air drying it has a thickness of 0.3 mil. Recordation development and readout are carried out as per Example 21. The readout display is comparable in quality to that obtained in Example 5.

EXAMPLE 24

To a 15% by weight solution of polystyrene in toluene is added 3% by weight of 4-dimethylaminochalcone. This solution is coated onto a 3 mil polyethylene terephthalate film (Du Pont Mylar) to give a layer which, on air drying, has a thickness of 0.3 mil. A 20% by weight solution of VYHH (Bakelite brand vinyl plastic made by Union Carbide Plastics Company) in methyl ethyl ketone is prepared, and to it is added 10% by weight of 4-phenylazodiphenylamine dye. This dye solution is knife coated onto the dry polystyrene layer such that it has a dry thickness of about 0.1 mil. Recordation and readout are carried out as per Example 4 with the exception that the readout acceleration potential is raised to 30 kv. The readout display is of quality equal to Example 3.

EXAMPLE 25

To a 15% by weight solution of polystyrene in toluene is added 3% by weight of 4-dimethylaminochalcone. This solution is knife coated onto the aluminum side of a 0.3 mil polyethylene terephthalate film (Du Pont Mylar) which had one of its faces coated with aluminum as in the above Example 16. After air drying, it has a thickness of 0.3 mil. To a 20% by weight solution of VYHH (Bakelite brand vinyl plastic made by Union Carbide Plastics Company) in methyl ethyl ketone is added 10% by weight of 4-phenylazodiphenylamine dye. This dye solution is knife coated onto the dry polystyrene layer such that it has an air dried thickness of 0.1 mil. Recordation and readout are carried out as per Example 21, the results obtained are similar to those obtained in Example 5.

Having described my invention, I claim:

1. A unitary sheet-like fluorescent recording medium adapted for recording in an imagewise pattern differential actinic radiation and capable of being readout thereafter by causing a so-irradiated medium to differentially fluoresce through electron bombardment, said medium having a pair of spaced, generally parallel faces and comprising in combination:

(a) a substantially nonfluorescent, grain-free organic imaging material and a grain-free fluorescent material, (b) said fluorescent material being so distributed within said medium as to be capable of uniform emission of its characteristic photon energy output relative to one face thereof when uniformly excited by electron bombardment, (c) said imaging material being (1) uniformly distributed through said medium relative to said one face thereof, and (2) capable of selectively altering its capacity to transmit said characteristic photon energy output after exposure to at least about 10 joules per square centimeter of actinic radiation applied normally to said one face to an extent at least sufficient to provide a measurable difference in its ability to transmit said photon energy after such an exposure compared to substantially nonactinically irradiated areas, (d) the interrelationship between said fluorescent material and said imaging material being such that said imaging material is adapted to (1) form after exposure to pre-chosen differential actinic radiation at least a latent image which is representative of said differential actinic radiation, and (2) be developed or fixed after exposure to said differential actinic radiation to the extent desired or necessary to produce an image therein.

2. A unitary sheet-like fluorescent recording medium adapted for recording in an imagewise pattern differential actinic radiation and capable of being readout thereafter by causing a so-irradiated medium to differentially fluoresce through electron bombardment, said medium having a pair of spaced, generally parallel faces and comprising in combination:

(a) a substantially nonfluorescent, grain-free organic imaging material (1) uniformly distributed through said medium relative to one face thereof, and (2) capable of selectively altering its capacity to transmit said characteristic photon energy output after exposure to at least about 10 joules per square centimeter of actinic radiation applied normally to said one face to an extent at least sufficient to provide a measurable difference in its ability to transmit said photon energy after such an exposure compared to substantially nonactinically irradiated areas, (b) a grain-free fluorescent material, so distributed within said medium as to be capable of uniform emission of its characteristic photon energy output relative to said one face when uniformly excited by electron bombardment, (c) a conductive layer comprising an electrically conductive material, (d) a supporting layer comprising a grain-free supporting material, and (e) when said conductive layer or said supporting layer or both are positioned between said imaging material and said fluorescent material, such layer(s) are each capable of transmitting at least 10% of the photon energy emitted by said fluorescent layer when excited, (f) the interrelationship between said imaging material, said fluorescent material, said conductive layer, and said supporting layer being such that said imaging material is adapted to (1) form after exposure to pre-chosen differential actinic radiation at least a latent image which is representative of said differential actinic radiation, and (2) be developed or fixed after exposure to said differential actinic radiation to the extent desired or necessary to produce an image therein.

3. The medium of claim 1 wherein said fluorescent material is a scintillator.

4. The medium of claim 1 wherein said imaging material alters its capacity to transmit said characteristic photon energy output by at least 10% after such an exposure to actinic radiation.

5. The medium of claim 1 wherein said imaging material contains a diazonium imaging system.

6. The medium of claim 1 wherein said imaging material contains a photochromic imaging system.

7. The medium of claim 1 wherein said imaging material contains a highly halogenated alkane imaging system.

8. The medium of claim 1 wherein said imaging material contains a dehydrohalogenation imaging system.

9. The medium of claim 1 wherein said imaging material contains a vesicular diazo imaging system.

10. The medium of claim 1 further including in combination a conductive layer comprising an electrically conductive material characterized by the feature that, when said conductive layer is positioned between said imaging material and said fluorescent material, said conductive layer is capable of transmitting at least 10% of the photon energy emitted by said fluorescent layer when excited.

11. The medium of claim 1 further including in combination a supporting layer comprising grain-free supporting material characterized by the feature that, when said supporting layer is positioned between said imaging material and said fluorescent material, said supporting layer is capable of transmitting at least 10% of the photon energy emitted by said fluorescent layer when excited.

12. The medium of claim 2 wherein said fluorescent material is a scintillator.

13. The medium of claim 2 wherein said imaging material alters its capacity to transmit said characteristic photon energy output by at least 10% after such an exposure.

14. The medium of claim 2 wherein said imaging material contains a diazonium imaging system.

15. The medium of claim 2 wherein said imaging material contains a photochromatic imaging system.

16. The medium of claim 2 wherein said imaging material contains a highly halogenated alkane imaging system.

17. The medium of claim 2 wherein said imaging material contains a dehydrohalogenation imaging system.

18. The medium of claim 2 wherein said imaging material contains a vesicular diazo imaging system.

19. A unitary sheet-like fluorescent recording medium having prerecorded therein an imagewise pattern differential actinic radiation and capable of being readout thereafter by causing such prerecorded medium to be bombarded by electrons to produce differential photon energy corresponding to said pattern therefrom, said medium having a pair of spaced, generally parallel faces and comprising in combination:

(a) a substantially nonfluorescent, grain-free organic imaging material and a grain-free fluorescent material, (b) said fluorescent material being so distributed within said medium as to be capable of uniform emission of its characteristic photon energy output relative to one face thereof when uniformly excited by electron bombardment, (c) said imaging material (1) being uniformly distributed through said medium relative to said one face thereof, (2) having previously been capable of selectively altering its capacity to transmit said characteristic photon energy output after exposure to at least about 10 joules per square centimeter of actinic radiation applied normally to said one face to an extent at least sufficient to provide a measurable difference in its ability to transmit said photon energy after such an exposure compared to substantially nonactinically irradiated areas, (3) having been exposed to prechosen differential actinic radiation sufficient to alter said characteristic photon energy output in an imagewise pattern representative of such prechosen differential actinic radiation, and (d) the interrelationship between said fluorescent material and said imaging material being such that one face thereof is capable of emitting a differential pattern of photon energy corresponding to the originally recorded differential actinic radiation used for recording if one face thereof is uniformly bombarded by energized electrons.

20. The medium of claim 19 wherein said fluorescent material is a scintillator.

21. The medium of claim 19 wherein said imaging material alters its capacity to transmit said characteristic photon energy output by at least 10% after such an exposure to actinic radiation.

22. The medium of claim 19 wherein said imaging material contains a diazonium imaging system.

23. The medium of claim 19 wherein said imaging material contains a photochromic imaging system.

24. The medium of claim 19 wherein said imaging material contains a highly halogenated alkane imaging system.

25. The medium of claim 19 wherein said imaging material contains a dehydrohalogenation imaging system.

26. The medium of claim 19 wherein said imaging material contains a vesicular diazo imaging system.

27. The medium of claim 19 further including in combination a conductive layer comprising an electrically conductive material characterized by the feature that, when said conductive layer is positioned between said imaging material and said fluorescent material, said conductive layer is capable of transmitting at least 10% of the photon energy emitted by said fluorescent layer when excited.

28. The medium of claim 19 further including in combination a supporting layer comprising a grain-free supporting material characterized by the feature that, when said supporting layer is positioned between said imaging material and said fluorescent material, said supporting laye ris capable of transmitting at least 10% of the photon energy emitted by said fluorescent layer when excited.

References Cited

UNITED STATES PATENTS

| | | | |
|---|---|---|---|
| 2,664,511 | 12/1953 | Moos | 250—71 |
| 3,107,138 | 10/1963 | Massena | 250—71 X |
| 3,148,276 | 9/1964 | Rothstein | 250—71 X |

ARCHIE R. BORCHELT, *Primary Examiner.*

U.S. Cl. X.R.

250—65